US011580157B2

(12) United States Patent
Rose et al.

(10) Patent No.: US 11,580,157 B2
(45) Date of Patent: Feb. 14, 2023

(54) PREDICTING TOPICS OF POTENTIAL RELEVANCE BASED ON RETRIEVED/CREATED DIGITAL MEDIA FILES

(71) Applicant: Google LLC, Mountain View, CA (US)

(72) Inventors: Robert Rose, Boulder, CO (US); Qun Cao, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 58 days.

(21) Appl. No.: 17/097,110

(22) Filed: Nov. 13, 2020

(65) Prior Publication Data

US 2021/0064653 A1  Mar. 4, 2021

Related U.S. Application Data

(63) Continuation of application No. 16/014,730, filed on Jun. 21, 2018, now Pat. No. 10,860,642.

(51) Int. Cl.
*G06F 16/583* (2019.01)
*G06F 16/14* (2019.01)
*G06N 20/00* (2019.01)

(52) U.S. Cl.
CPC ........ *G06F 16/5838* (2019.01); *G06F 16/144* (2019.01); *G06N 20/00* (2019.01)

(58) Field of Classification Search
CPC .............. G06F 16/5838; G06F 16/144; G06F 16/9535; G06F 16/248; G06N 20/00; G06K 9/6268

(Continued)

(56) References Cited

U.S. PATENT DOCUMENTS 5,754,939 A  5/1998 Herz et al.
5,761,662 A  6/1998 Dasan
(Continued)

FOREIGN PATENT DOCUMENTS

JP  2008141416  6/2008
JP  2017049953  3/2017
(Continued)

OTHER PUBLICATIONS

Weng, L. et al. "A Privacy-Preserving Framework for Large-Scale Content-Based Information Retrieval"; IEEE Transactions on Information Forensics and Security; vol. 10, No. 1, pp. 152-167; Jan. 1, 2015.

(Continued)

*Primary Examiner* — Evan Aspinwall
(74) *Attorney, Agent, or Firm* — Gray Ice Higdon (57) ABSTRACT

Implementations are described herein for leveraging digital media files retrieved and/or created by users to predict/determine topics of potential relevance to the users. In various implementations, digital media file(s) created and/or retrieved by a user with a client device may be applied as input across trained machine learning model(s), which in some cases are local to the client device, to generate output that indicates object(s) detected in the digital media file(s). Data indicative of the indicated object(s) may be provided to a remote computing system without providing the digital media file(s) themselves. In some implementations, information associated with the indicated object(s) may be retrieved and proactively output to the user. In some implementations, a frequency at which objects occur across a corpus of digital media files may be considered when determining a likelihood that a detected object is potentially relevant to a user.

14 Claims, 8 Drawing Sheets

(58) Field of Classification Search
USPC .................................................... 707/759
See application file for complete search history.

(56) References Cited

U.S. PATENT DOCUMENTS

| | | | |
|---|---|---|---|
| 6,701,362 B1 | 3/2004 | Subramonian et al. | |
| 7,181,488 B2 | 2/2007 | Martin et al. | |
| 7,493,372 B2 | 2/2009 | Crabtree et al. | |
| 7,751,805 B2 | 7/2010 | Neven et al. | |
| 8,943,015 B2 | 1/2015 | Davis et al. | |
| 9,037,600 B1 | 5/2015 | Garrigues et al. | |
| 9,135,631 B2 | 9/2015 | Mitchell et al. | |
| 9,672,496 B2 | 6/2017 | Mitchell et al. | |
| 10,043,109 B1* | 8/2018 | Du | G06N 3/08 |
| 10,109,051 B1 | 10/2018 | Natesh et al. | |
| 10,191,921 B1* | 1/2019 | Can | G06F 16/58 |
| 10,282,431 B1 | 5/2019 | Bhotika et al. | |
| 10,503,775 B1 | 12/2019 | Ranzinger et al. | |
| 10,706,098 B1* | 7/2020 | Ramesh | G06F 16/58 |
| 2002/0123928 A1 | 9/2002 | Eldering et al. | |
| 2002/0174134 A1 | 11/2002 | Goykhman | |
| 2003/0005134 A1 | 1/2003 | Martin et al. | |
| 2006/0224587 A1 | 10/2006 | Zamir et al. | |
| 2006/0240862 A1 | 10/2006 | Neven et al. | |
| 2006/0293957 A1 | 12/2006 | Petersen et al. | |
| 2009/0172730 A1 | 7/2009 | Schiff et al. | |
| 2011/0088059 A1 | 4/2011 | Wilson et al. | |
| 2011/0238503 A1 | 9/2011 | Naini | |
| 2012/0239506 A1 | 9/2012 | Saunders et al. | |
| 2014/0019546 A1 | 1/2014 | Narasimha | |
| 2015/0058079 A1 | 2/2015 | Freund et al. | |
| 2015/0365725 A1 | 12/2015 | Belyaev et al. | |
| 2016/0042252 A1 | 2/2016 | Sawhney et al. | |
| 2016/0196350 A1 | 7/2016 | Mau | |
| 2016/0292299 A1 | 10/2016 | Diwakar et al. | |
| 2016/0350332 A1 | 12/2016 | Cunico et al. | |
| 2017/0097932 A1 | 4/2017 | Bakshi et al. | |
| 2017/0206196 A1* | 7/2017 | Raichelgauz | H04N 21/466 |
| 2018/0089542 A1 | 3/2018 | Stoop et al. | |
| 2018/0101540 A1 | 4/2018 | Stoop et al. | |
| 2018/0181667 A1 | 6/2018 | Kolb et al. | |
| 2018/0260417 A1 | 9/2018 | Mahadevan et al. | |
| 2019/0188285 A1 | 6/2019 | Scheau et al. | |
| 2019/0220694 A1 | 7/2019 | Biswas et al. | |
| 2019/0311301 A1 | 10/2019 | Pyati | |
| 2021/0232577 A1* | 7/2021 | Ogawa | G06F 3/015 |

FOREIGN PATENT DOCUMENTS

| | | |
|---|---|---|
| JP | 2017059156 | 3/2017 |
| JP | 2018537759 | 12/2018 |
| KR | 20160091488 | 8/2016 |
| WO | 2017062170 | 4/2017 |
| WO | 2017071969 | 5/2017 |

OTHER PUBLICATIONS

European Patent Office; International Search Report and Written Opinion of Ser. No. PCT/US2019/038152; 14 pages; dated Sep. 10, 2019.
The Korean Intellectual Property Office; Office Action issued in Application No. 10-2020-7035649; 8 pages; dated Jan. 24, 2022.
Japanese Patent Office; Notice of Allowance issued in Application No. 2020568971; 3 pages; dated Jul. 12, 2021.
The Korean Intellectual Property Office: Notice of Allowance issued in Application No. 10-2020-7035649, 3 pages, dated Jul. 22, 2022.
Japanese Patent Office; Notice of Office Action issued in Application No. 2021130662; 11 pages; dated Nov. 22, 2022.

* cited by examiner

PREDICTING TOPICS OF POTENTIAL RELEVANCE BASED ON RETRIEVED/CREATED DIGITAL MEDIA FILES

BACKGROUND

Topics of potential relevance to individuals, or "users," are often used to generate, select, and/or curate information that is presented to them. For example, search engines often rely on user interests that are determined, for instance, from user profiles, to rank search results, generate alternative query suggestions, etc. A user's interests can be determined from a variety of different sources to which the user permits access, such as the user's browsing history, documents (particularly cloud-based documents), prior search queries, calendars, explicit user-preferences, and so forth. In many cases, knowing more about a particular user's interests enables more customization/tailoring of content that is presented to the user, which in turn improves the user's experience. However, additional potential sources for determining user interests remain untapped.

SUMMARY

The present disclosure is generally directed to methods, apparatus and computer-readable media (transitory and non-transitory) for leveraging digital media files retrieved and/or created by users to predict/determine topics of potential relevance to the users (e.g., their interests or interests of others close to them, user preferences, etc.). In various implementations, information and/or data related to those topics then can be proactively provided to the users. In various implementations, digital media files created/retrieved by users, such as digital photographs, digital videos, digital audio files, and so forth, may be analyzed using a variety of techniques to detect one or more objects represented in those digital media files. An "object" may include any person, place, or thing. Some unique objects, such as a particular person (e.g., a celebrity), a unique object (e.g., an infamous object like the Hope diamond), and so forth, may alternatively be referred to herein and/or elsewhere as an "entity," especially in the context of knowledge graphs. Most objects, such as fungible objects, may have types or classes, and/or may be members of various hierarchies (e.g., Granny Smith apple→apple→fruit→plant→lifeform). Based on these detected objects, alone or in combination with other user interest signals, topics of potential relevance (e.g., user interests) may be determined and used to present relevant information to users.

In one aspect, objects detected in digital media file(s) created/retrieved by a user may be leveraged to various degrees to identify topic(s) of potential relevance to the user. For example, background and/or incidental objects detected in a user's digital photographs (and/or digital videos) that are commonplace among a corpus of digital photographs acquired by a population of users, such as furniture, trees, scenery, etc., may not be highly indicative of the user's interest. By contrast, less commonplace objects that are encountered less frequently in the corpus of digital photographs may be more highly indicative of the user's interest. This is particularly true if these less-commonplace objects are detected across multiple digital photographs taken by a user. For example, if bourbon bottles are not particularly common across the corpus of digital photographs acquired by the population of users, the fact that bourbon bottles feature heavily among a particular user's digital photographs is likely indicative of an interest of the user in bourbon, or at least in bourbon bottles. Alternatively, this fact might be indicative of interest of the user in decorative bottles or otherwise unusual bottles. And if there are multiple pictures of bottles of different types (e.g., bourbon bottle, scotch bottle, wine bottle, medicine bottle, etc.), that may indicate a general interest in bottles. As another example, if one or more bourbon bottles appear in a user's photographs, but the user also views and/or creates pictures of a distillery, e.g., while on a distillery tour, and/or views and/or creates pictures of bourbon labels, these may be, collectively, strong signals of a general interest in bourbon.

Once topics of potential relevance to a user are identified using techniques described herein, these identified topics may be used for various purposes. In some implementations, information that is associated with the identified topics may be obtained and presented or "pushed" to the user proactively, e.g., as a notification "card" or "tile" presented on a touchscreen of a smart phone, as output from an automated assistant with which the user is engaged in a human-to-computer dialog session, in an incoming text message, and so forth. In some implementations, the topics of potential relevance to a user may be used—e.g., by a client device operated by the user or by a remote computing server forming what is often referred to as "the cloud"—to formulate a search query. Information that is responsive to this search query may be obtained and pushed to the user. Additionally or alternatively, in some implementations, one or more user topics may be associated in a database with various predetermined content, e.g., curated content, that is presented automatically to a user once it is determined that the topic is potentially relevant to the user.

Implementations such as these may enable identification of topics of potential relevance to users of which users themselves may not be aware. As an example, suppose a father acquires a number of digital photographs and/or digital videos of his family. Suppose further that one of his children is consistently portrayed in these digital media files interacting with a particular type of object. For example, in one photograph his son is playing with a toy motorcycle, in another photograph his son is wearing a shirt that depicts a motorcycle, in another example his son is posing on top of an uncle's motorcycle, etc. Even if for some reason the father is not consciously aware of his son's interests in motorcycles, techniques described herein may enable identification of the topic "motorcycle" as being relevant to the father due to it being an interest of the son (even if the father is himself distinctly uninterested in motorcycles, his son's interest in motorcycles may make that topic at least relevant to the father). Consequently, information may be pushed to the father that is relevant to motorcycles. For example, as the son's birthday approaches, the father may be presented with information about potential motorcycle-related presents for the son.

In another aspect, a variety of techniques may be implemented locally at client devices operated by users to detect objects represented in digital media files, so that topics/interests can be identified and used as described previously. Data indicative of these detected objects may be provided by the client devices to remote computing servers (e.g., the cloud)—without providing the underlying digital media files—so that the remote computing systems can determine whether those detected objects are probative of topics that likely are relevant to users. For example, in some implementations, one or more trained machine learning models may be stored locally on a client device. Data indicative of digital media created/captured at the client device may be applied (locally at the client device) as input across the trained machine learning model to generate output that indicates one or more objects. This output may be used as described above to, for instance, proactively present content of potential relevance to a user at one or more client devices.

Techniques described herein give rise to various technical advantages. As an example, employing local, on-device models to detect objects in digital media files created and/or retrieved by users enables topics of potential relevance to users to be identified/used without exposing the user's digital media files (especially those created by the user, which may considered highly private) to the cloud. Further, employing local, on-device models enables data to be transmitted by the client device, for use in providing information relevant to topics of potential relevance, where the data consumes less network bandwidth than if the digital media files were instead transmitted. This can be beneficial, for example, in situations where the client device is utilizing a limited bandwidth network connection and can enable relevant information to be provided more quickly to the client device (e.g., without having to await the client device to utilize a higher bandwidth network connection).

As another example, identifying topics of potential relevance to users and using these topics to obtain/generate/curate content presented to the users may reduce the input required by those users to reach content they desire. For example, ranking search results based on topics identified using techniques described herein may allow a user to more quickly find what they are looking for with less input, conserving computing resources such as network bandwidth, memory, battery power, etc. To this end, in various implementations, topics of potential relevance to a user may be persisted in memory, e.g., at one or more client devices operated by the user and/or in the cloud, in association with the user for future use (e.g., by being associated with the user's profile). As another example, digital media files created or at least edited by users may be more indicative of the user's interest than, say, digital media files that are merely retrieved (e.g., viewed, played back, etc.) passively by the user, files shared with other users, or other signals such as search history (which may indicate passing interests, rather than more core interests). Consequently, techniques described herein may identify topics that are highly likely to be relevant to a user, improving the user experience.

In some implementations, a computer implemented method may be provided that includes: receiving data indicative of one or more digital media files from one or more client devices operated by a user; identifying one or more objects detected in each of the one or more digital media files based on the data indicative of the one or more digital media files; determining a frequency of each of the one or more objects across a corpus of digital media files provided by a population of users; selecting one or more of the objects based on corresponding frequencies; identifying one or more topics of potential relevance to the user based on the selected one or more objects; formulating a search query based on the identified one or more topics; and proactively causing information responsive to the formulated search query to be output at one or more of the client devices operated by the user.

In various implementations, the data indicative of the one or more digital media files may include one or more digital images, and identifying the one or more objects may include performing image recognition on the one or more digital images to identify the one or more objects. In various implementations, the data indicative of the one or more digital media files may include one or more audio files, and identifying the one or more objects may include performing audio analysis on the one or more audio files to identify the one or more objects.

In various implementations, the data indicative of the one or more digital media files may include one or more feature vectors or reduced dimensionality embeddings extracted from the one or more digital media files. In various implementations, the selecting may be further based on positions of the one or more objects in the one or more digital media files.

In various implementations, the selecting may be further based on measures of focus of the one or more objects in the one or more digital media files. In various implementations, the selecting may be further based on position coordinates associated with the one or more digital media files received from the one or more client devices.

In another aspect, a method implemented by one or more processors may include: obtaining one or more digital media files created by the user with the client device; applying the one or more digital media files as input across one or more trained machine learning models that are local to the client device, wherein the one or more trained machine learning models generate output that indicates one or more objects detected in each of the one or more digital media files; providing, to a remote computing system, data indicative of the indicated one or more objects, without providing the one or more digital media files; receiving, from the same remote computing system or a different remote computing system, information associated with the indicated one or more objects; and proactively outputting the information associated with the indicated one or more objects to the user at the same client device or a different client device operated by the user.

In various implementations, the providing may cause the remote computing system to formulate a search query based on the identified one or more objects, and the information associated with the indicated one or more objects comprises information that is responsive to the formulated search query.

In various implementations, the method may further include: receiving, from the remote computing system, the search query; and issuing the search query in order to receive, in response to the issuing, the information that is responsive to the search query. In various implementations, the remote computing system may use the formulated search query itself to obtain the information that is responsive to the formulated search query.

In various implementations, the remote computing system may determine one or more topics of potential relevance to the user based on the data indicative of the indicated one or more objects, and the information associated with the indicated one or more objects may include information that is associated with the one or more interests in a database.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
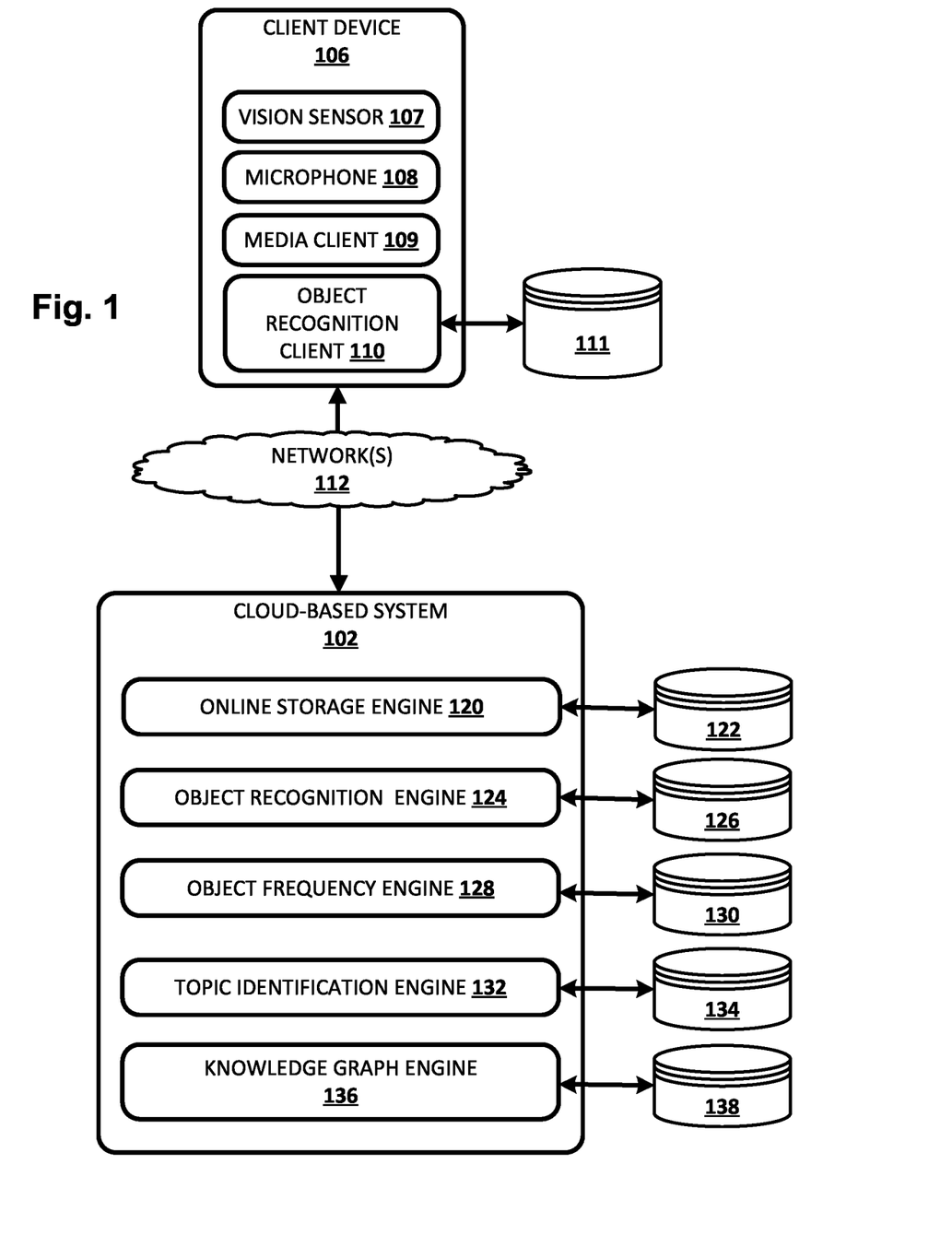
FIG. 1 illustrates an example environment in which selects aspects of the present disclosure may be implemented.

FIG. 1 illustrates an example environment in which topics of potential relevance to users may be identified based on the users' creation and/or retrieval (e.g., consumption) of digital media files. The example environment includes a client device 106 and a cloud-based system 102. Cloud-based system 102 may be implemented in one or more computers that communicate, for example, through a network (not depicted). Cloud-based system 102 may be an example of a system in which the systems, components, and techniques described herein may be implemented and/or with which systems, components, and techniques described herein may interface. Although described as being implemented in large part on a "cloud-based system" herein, disclosed techniques may actually be performed on systems that serve a variety of purposes, such as email systems, text messaging systems, social networking systems, voice mail systems, productivity systems, enterprise software, search engines, and so forth.

A user may interact with cloud-based system 102 via client device 106. Other computer devices may communicate with cloud-based system 102, including but not limited to additional client devices and/or one or more servers implementing a service for a website that has partnered with the provider of cloud-based system 102. For brevity, however, the examples are described in the context of client device 106.

Client device 106 may be a computer in communication with cloud-based system 102 through a network such as a local area network (LAN) or wide area network (WAN) such as the Internet (one or more such networks indicated generally at 112). Client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker that operates a voice-interactive personal digital assistant (also referred to as an "automated assistant"), or a wearable apparatus of the user that includes a computing device (e.g., a watch of the user having a computing device, glasses of the user having a computing device, a wearable music player). Additional and/or alternative client devices may be provided.

Client device 106 may include various software and/or hardware components. For example, in FIG. 1, client device 106 includes a vision sensor 107 and a microphone 108. Vision sensor 107 may take various forms, such as a digital camera, a passive infrared ("PIR") sensor, an RGBd sensor, a stereoscopic camera, and so forth. Vision sensor 106 may be operated, e.g., by a user (not depicted), to capture one or more digital images, e.g., as standalone digital images and/or as a sequence of digital image frames that form a digital video. Microphone 108 may be operated, e.g., by the user, to capture various sounds, such as utterances by the user. In some scenarios, vision sensor 107 and microphone 108 may be used together, e.g., to capture a multimedia audio/visual digital media file such as a video recording.

Client device 106 may also execute various software. For example, in the implementation depicted in FIG. 1, client device 106 executes a media client 109 and an object recognition client 110. In various implementations, media client 109 may be operable, e.g., by the user, to create and/or retrieve (e.g., for consumption) digital media files. As used herein, "digital media files" may include digital images (e.g., photographs), digital video (with or without sound), computer-aided design ("CAD") files, audio files (e.g., songs, podcasts, etc.), and so forth. In some implementations, client device 106 may execute multiple media clients 109, e.g., for multiple different types of digital media files. However, for the sakes of brevity and simplicity, implementations referred to herein will be described as having a single media client 109 installed. In some implementations, digital media files created using media client 109 may be uploaded (e.g., backed up, transferred) to cloud-based system 102, e.g., for safe and/or secure storage in one or more cloud storage databases 122 by an online storage engine 120. Additionally or alternatively, online storage engine 120 may form part of a social network, such that digital media files that the user uploads or shares on their social network account may be analyzed using techniques described herein.

Object recognition client 110 may be configured to recognize objects that are represented in digital media files that are retrieved and/or created using media client 109. In some implementations, all object recognition may be performed at cloud-based system 102, in which case object recognition client 110 may not be installed on client device 106. However, in some implementations, object recognition client 110 may be installed on client device 106 in order to preserve privacy of the user. For example, in some implementations, object recognition client 110 may have access to an "on-device" object recognition model database 111 (the terms "index" and "database" are used herein interchangeably). The on-device model database 111 may store one or more object recognition modules and/or models that may be useable, e.g., by object recognition client 110, to detect objects represented in digital media files and/or to provide output that indicates one or more detected objects. Accordingly, the data generated by these models, rather than the raw data of the digital media files in which the objects were detected, may be provided to cloud-based system 102. Examples of how object recognition may be performed will be described below.

In some implementations, client device 106 and cloud-based system 102 each include memory for storage of data and software applications, a processor for accessing data and executing applications, and components that facilitate communication over network 112. The operations performed by client device 106 and/or cloud-based system 102 may be distributed across multiple computer systems. Cloud-based system 102 may be implemented as, for example, computer programs running on one or more computers in one or more locations that are coupled to each other through a network.

In various implementations, cloud-based system 102 may include an online storage engine 120, an object recognition engine 124, an object frequency engine 128, a topic identification engine 132, and/or a knowledge graph engine 136. In some implementations one or more of engines 120, 124, 128, 132 and/or 136 may be combined and/or omitted. In some implementations, one or more of engines 120, 124, 128, 132 and/or 136 may be implemented in a component that is separate from cloud-based system 102. In some implementations, one or more of engines 120, 124, 128, 132 and/or 136, or any operative portion thereof, may be implemented in a component that is executed by client device 106.

In this specification, the term "database" and "index" will be used interchangeably and broadly to refer to any collection of data. The data of the database and/or the index does not need to be structured in any particular way and it can be stored on storage devices in one or more geographic locations. Thus, for example, the indices 111, 122, 126, 130, 134, 138 may include multiple collections of data, each of which may be organized and accessed differently.

Turning now to cloud-based system 102, in various implementations, online storage engine 120 may be configured to store various types of digital content of a user, such as digital media files, in cloud storage 122 that is often referred to as "cloud storage." For example, a user may have an online profile that synchronizes data between multiple client devices 106 operated by the user. This synchronization may be facilitated by online storage engine 120, e.g., by storing copies of all of the user's digital content that is to be synchronized in a cloud storage 122. A user may deliberately cause online storage engine 120 to store digital content in cloud storage 122, e.g., by uploading that content directly and/or by storing that content in storage folder(s) on one or more client devices 106 that are designated for cloud storage. Additionally or alternatively, in some implementations, various digital content of the user may be automatically stored, e.g., by online storage engine 120, in index 122 as part of an automated backup process. For example, some cloud computing service providers offer their users free or fee-based automatic backup of digital photos, videos, or other digital media files.

Like object recognition client 110, object recognition engine 124 may be configured to identify objects represented in digital media files. However, object recognition client 110 operates on a resource-constrained client device 106 and therefore may have limited capabilities. For example, in some implementations, a limited number of on-device object recognition models may be stored in on-device model index 111. By contrast, object recognition engine 124 may be able to leverage the virtually limitless resources of the cloud to perform object recognition, and therefore may be far more capable, robust, etc., than object recognition client 110. For example, object recognition engine 124 may have access to an index 126 of object recognition modules and/or models that is far larger than on-device index 111 available to object recognition client 110. In some implementations, if object recognition client 110 is unable to detect/recognize one or more objects in a digital media file, or at least is unable to recognize them with sufficient confidence, the digital media file (or some variation of data indicative thereof) may be provided to object recognition engine 124 to perform the object recognition analysis.

Object recognition and/or detection may be performed, e.g., by object recognition client 110 and/or object recognition engine 124, using various different techniques. In some implementations, on-device model index 111 and/or cloud-based model index 126 may include object models (e.g., computer-aided design, or "CAD", based) that may be used and/or triggered to provide inferences about object types, e.g., using vision and/or depth data obtained by one or more vision sensors (e.g., 107). Additionally or alternatively, on-device model index 111 and/or cloud-based model index 126 may include 2D patterns or profiles of objects that may be matched to portions of 2D image data (e.g., video frames) captured by one or more vision sensors (e.g., 107). In yet other implementations, on-device model index 111 and/or cloud-based model index 126 may include routines (e.g., state machines) that may be implemented/triggered by object recognition client 110 and/or object recognition engine 124 to provide inferences about object type. In some implementations, object recognition client 110 and/or object recognition engine 124 may detect textual content in digital images, e.g., by using optical character recognition ("OCR") to recognize text contained, for instance, in the background of an image (e.g., a street sign or store front), on clothing depicted in the image, and so forth.

In some implementations, one or more machine learning models may be trained to generate output that indicates one or more objects detected in digital media files. For example, one or more convolutional neural networks ("CNN") may be trained to generate, based on digital image files (individual photographs or video frames), output that indicates one or more objects detected in the digital media files, and in some cases confidences associated with those detected objects.

As a non-limiting example, a CNN may be trained using a corpus of digital images, each labeled with one or more objects that are represented in the digital image. Each training example may be applied as input across the CNN to generate output. The output may then be compared with the label associated with the training example to determine a difference, or error. Based on this error, various techniques may be employed to train the CNN, such as back propagation, gradient descent, etc. Once trained (e.g., using hundreds, or thousands of training examples), an unlabeled digital image may be applied as input across the CNN to generate output that is indicative of one or more objects detected in the digital image, and in some cases a confidence measure of the output.

In addition to recognizing objects in digital images (whether from individual digital photographs or digital video frames), in some implementations, object recognition client 110 and/or object recognition engine 124 may be configured to detect objects (or more generally, topics) in digital audio content (whether standalone or accompanying digital video). For example, in some implementations, object recognition client 110 and/or object recognition engine 124 may employ techniques such as speech recognition to detect mentions of objects in audio data. In some implementations, on-device model index 111 and/or cloud-based model index 126 may store one or more models, such as one or more machine learning models, that are trained to detect mentions of various objects in audio data. Additionally or alternatively, in some implementations, object recognition client 110 and/or object recognition engine 124 may employ speech-to-text processing to generate speech recognition output (i.e. text) from audio data, and then analyze the text using techniques such as natural language processing, entity tagging, etc., to identify mentioned objects, or more generally, topics of potential interest to users.

Topic identification engine 132 may be configured to identify, based on various signals, one or more topics of potential relevance to one or more users. In some implementations, these topics may be stored in a user interest index 134, e.g., in association with the applicable users, so that they can be used later for a variety of purposes, including but not limited to ranking search results, generating alternative query suggestions, selecting and presenting digital content (e.g., advertisements), recommending media/restaurants/etc., and so forth. These signals may take a variety of different forms and may come from a variety of different sources. In some implementations, topic identification engine 132 may identify topics of potential interest or relevance to a user based on analysis performed by object recognition client 110 and/or object recognition engine 124 on digital media files created and/or retrieved by the user. For example, suppose object recognition engine 124 detects, in multiple digital photographs captured by a user, multiple representations of classic cars. Even if the user has not explicitly indicated an interest in classic cars, these detections may be used, e.g., by topic identification engine 132, to determine that the user may potentially be interested in classic cars.

In addition to the bare fact that an object is detected in a digital media file, various other attributes of the digital media file, and the detected object's role or prominence in that file, may also be considered by topic identification engine 132. In some implementations, a prominence of a detected object within a digital image may be determined (e.g., at 110/124) and used to weight the object's potential as a topic of relevance to a user. For example, a position of a detected object within an image, a size of the detected object relative to the entire image, the size of the detected object relative to other objects detected in the image, a measure of focus of the object relative to other detected objects (e.g., how blurry is the object compared to other detected objects), the number of objects of a particular type in one or more images (e.g., three apples depicted in a picture may be more probative of relevance than one apple), and other similar data points may be provided, e.g., by object recognition client 110 and/or object recognition engine 124, and considered (e.g., by topic identification engine 132) when determining the detected object's measure of prominence. In some implementations, a measure of prominence of a particular detected object may be compared, e.g., by topic identification engine 132, to one or more thresholds and/or to one or more other measures of prominence associated with other detected objects to determine whether (or how much) the object (and more generally, a topic determined from the object) should be deemed of potential relevance to the user.

For example, if a particular type of car is featured prominently in one or more digital images, such as in the foreground, middle of the image, etc., that may be highly probative that the detected car (and more generally, a topic derived therefrom) is likely of interest to the user. By contrast, if an object is detected in the background of a digital image, off to the side, or even not wholly depicted in the image (e.g., is cut off at the top, the side, etc.), that may be less probative of potential user interest in the object because the object's representation in the digital media file may be merely accidental and/or incidental. In some implementations, topic identification engine 132 may consider how many objects are detected in a particular digital media file, such that any individual object detected in the digital image is not weighted too heavily. In some such implementations, a detected object's prominence in the digital image may be taken into account, e.g., by topic identification engine 132, in conjunction with a total number of objects in the image. For instance, if a large number of objects are detected in a given digital image but a particular object is featured far more prominently than other detected objects, that particular object may be weighted more heavily by topic identification engine 132.

Additionally or alternatively, in some implementations, topic identification engine 132 may identify based on metadata associated with digital media content. For example, suppose a user gives a particular digital photograph a filename that describes an object represented in the digital photo. This metadata may be used, e.g., by topic identification engine 132 as a signal that (alone or in combination with other signals) may suggest user interest in one or more topics. In some implementations, the fact that a user takes the time to explicitly define metadata that identifies one or more topics may be highly probative of the user's potential interest in those topics. Other usable metadata may include, for instance, folders in which digital media files are stored on client device 106 and/or in cloud storage 122. For example, if a large number of images are stored in a folder entitled "pictures of birds," then topic identification engine 132 may presume a user interest in the topic of birds. As another example, in some implementations, metadata associated with media consumed (e.g., streamed) by a user may be considered by topic identification engine 132. For example, titles, blurbs, descriptions, cast, crew, or other metadata associated with online streaming videos a user watches may be used to identify topics of potential relevance to the user.

Additionally or alternatively, in some implementations, topic identification engine 132 may identify topics based on the nature of a user's interaction with one or more digital media files over time. For example, if the user tends to repeatedly open particular digital images in their library (more than other images in their library), topic identification engine 132 may determine that objects represented in those particular images are potentially relevant to the user, especially if other less-viewed images do not tend to depict those same objects. This may include digital images stored in application cache. For example, suppose a user repeatedly revisits a particular web page that lists a car for sale, and that the web page includes a photo of the car. When that photo is loaded into the web browser from cache (rather than re-downloading the photo), that may count as the user once again viewing the photo, which may in turn lead to objects in the photo being identified as potential relevant.

In addition to or instead of objects detected in digital media files created/retrieved by a user, various other signals may be employed by topic identification engine 132 in various implementations. In some implementations, signals such as a user's search query history, browsing history, explicitly provided personal preferences, and so forth, may be used, e.g., by topic identification engine 132, to identify one or more topics of potential interest to the user. Additionally or alternatively, in some implementations, signals such as content of a user's emails/text messages, content of a user's social media profile, contents of a user's calendar, and various other application data may be used, e.g., by topic identification engine 132, to identify topics of potential relevance to a user. In various implementations, previously-identified topics of potential relevance to a user may themselves be used to identify new potential topics of relevance. For example, suppose a user takes photos of skis, snow-capped peaks, ice skates, and views images of winter gear (e.g., while online shopping). These may lead to the user being associated with the relatively narrow topics of "skiing," "mountaineering," "ice skating," and "winter gear." In some implementations, these topics may be considered collectively, e.g., by topic identification engine 132, to identify other topics higher up a topic hierarchy (e.g., as determined from knowledge graph engine 136), such as "winter sports."

It should be understood that in various implementations, users may have the ability to opt in and/or opt out of various data being used as signals with techniques described herein. For example, in some implementations, a default user profile setting may be that few or no signals are available to topic identification engine 132. Only when the user explicitly provides authorization to each signal (or groups of signals) may topic identification engine 132 gain access to these signals for topic identification purposes.

Various types of signals may be weighted differently by topic identification engine 132. For example, objects detected in digital media files created by a user may be more probative of potential user interest in topics relating to those objects than, say, objects detected in digital media files that the user merely retrieves for consumption (e.g., viewing, playback, etc.). Similarly, in some implementations there may be a hierarchy of weights assigned to objects detected in digital media files interacted with by a user. For example, objects detected in digital media files created by the user may be assigned the most weight. Objects detected in digital media files that are shared with the user, e.g., by another user, may be assigned a medium amount of weight. Objects detected in digital media files that a user retrieves over the Internet, e.g., as part of a web search, may be assigned the least amount of weight. Other factors that may be considered as part of this "hierarchy" of weights include, but are not limited to, how long a user consumed a particular digital media file, whether the user "completed" consuming a digital media file (e.g., played the entire song or video), whether the user edited the digital media file, whether the user shared the digital media file, and so forth.

In some implementations, various signals may be analyzed in combination to determine whether/how much a particular topic might be relevance to a user. For example, in some implementations, detection of an object in a user-created digital media file may not be enough by itself to warrant use of the detected object to identify a topic of potential interest to the user. However, if other signals corroborate the initial user-created digital media file signal, then that detected object may be used to identify one or more topics of potential interest to the user.

In some implementations, a signal of potential user interest in a topic may be weighted based on part on whether objects associated with that topic are commonplace across digital media content created/retrieved by a population of users. In FIG. 1, for instance, an object frequency engine 128 may be configured to determine a frequency of one or more objects across a corpus of digital media files (e.g., stored in index 130 or even in index 122) retrieved and/or created by a population of users. In some such implementations, a frequency at which an object occurs across the corpus may be inversely related to how heavily the object is weighted when identifying topics of potential interest. For example, furniture such as desks or tables may be extremely commonplace across a corpus of images. Accordingly, if a particular user takes one or more digital photos that capture a table or desk, this does not necessarily suggest that the user is interested in the topics "desks" or "tables." Rather, the presence of those commonplace pieces of furniture may merely be incidental to the digital photographs.

In some implementations, various numerical statistics, such as term frequency-inverse document frequency, or "TF-IDF", may be employed by topic identification engine 132 and/or by object frequency engine 128 to determine whether and/or how much detected objects should affect topic identification. For example, in some implementations, TD-IDF may be used, e.g., by object frequency engine 128, to determine how much a particular detected object (which may be used as the "term" of "TF-IDF") should influence whether a particular topic is identified as being of potential relevance to a user.

Knowledge graph engine 136 may be configured to provide access to a knowledge graph 138. In various implementations, knowledge graph 138 may include nodes that represent known entities (and in some cases, entity attributes), as well as edges that connect the nodes and represent relationships between the entities. For example, a "banana" node may be connected (e.g., as a child) to a "fruit" node, which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

In various implementations, topic identification engine 132 may utilize one or more of the signals mentioned previously in conjunction with information obtained from knowledge graph engine 136 to identify one or more topics of potential interest to a user. For example, suppose various species of objects are detected across multiple digital photographs captured and/or retrieved by a user. In various implementations, knowledge graph engine 136 may determine that those species all fall under the hierarchy of a particular genus, and that the occurrence of the multiple different species evidences a potential interest in the genus.

As another example, suppose a user watches a plurality of digital videos. Each of these digital videos may be represented in knowledge graph 138, and may be connected to related entities (e.g., actors, producers, cast members, etc.). In various implementations, knowledge graph engine 136 may utilize the various entity relationships in knowledge graph 138 to predict, based on the user's watching of the multiple digital videos, one or more topics of potential interest to the user (e.g., movies and/or genres the user may be interested in, places the user might be interested in, etc.).

As yet another example, suppose a user watches a football game one night, then a baseball game another night, and then takes a digital photograph at a basketball game on a third night. In various implementations, topic identification engine 132 may determine, e.g., based on entities such as teams associated with each of these events, or the events themselves, that the user has a broad interest in, for example, professional sports. If all of the teams are from the same city, then in some implementation, topic identification engine 132 may identify that city as a topic of potential interest to the user.

Figure 2:
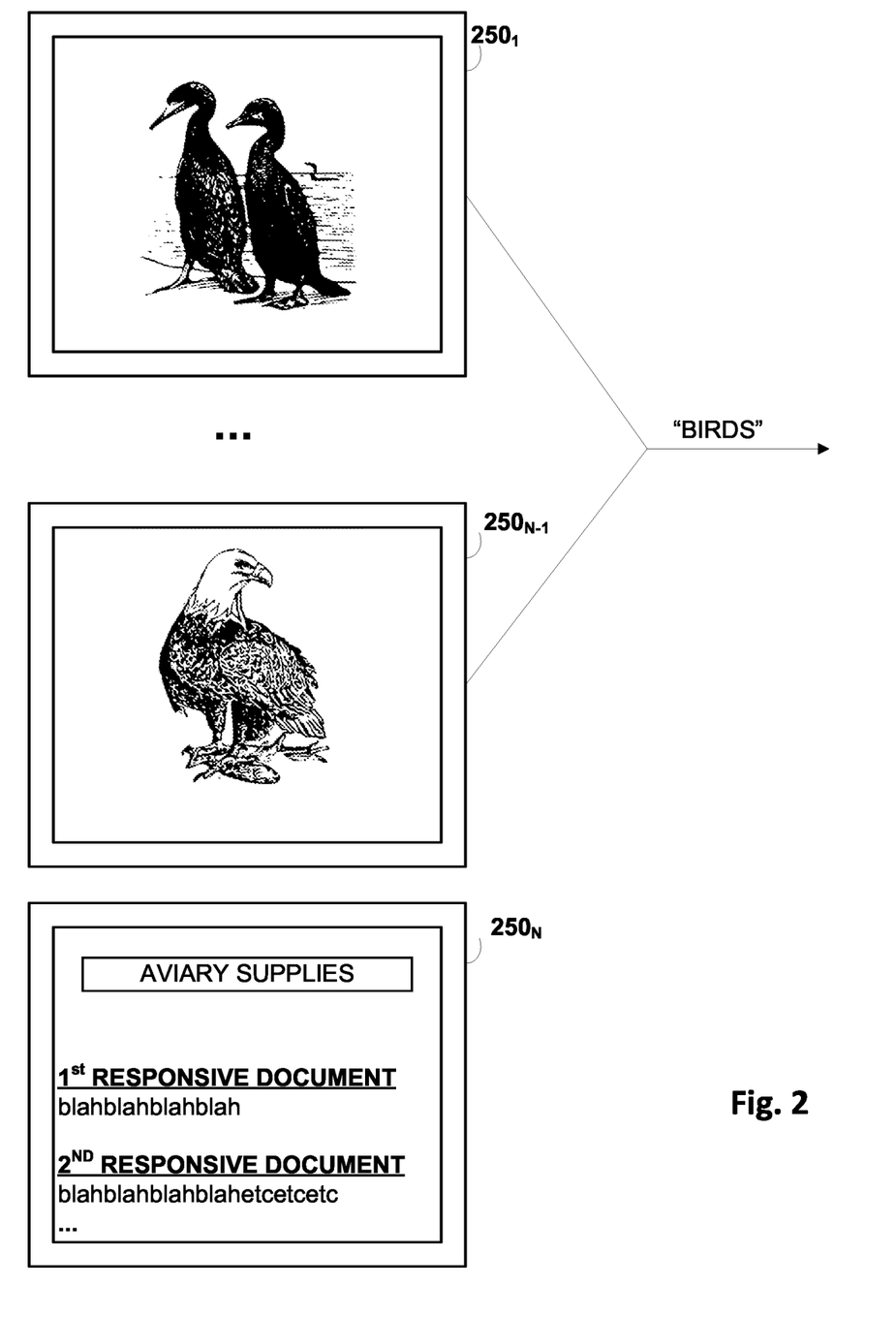
FIGS. 2, 3, and 4 depicts example scenarios in which techniques described herein may be employed, in accordance with various implementations.

FIG. 2 depicts one example scenario in which techniques may be employed to identify, based on a variety of signals $250_{1-N}$, one or more topics of potential relevance or interest to a user. In FIG. 2, a first signal $250_1$ takes the form of a digital image captured by a user using vision sensor 107 of a client device 106. This digital image may be stored, e.g., by online storage engine 120, in cloud-based storage 122. As part of the uploading process, the digital image may be analyzed, e.g., by object recognition client 110 and/or object recognition engine 124, to detect one or more objects. In the example of FIG. 2, a pair of heron birds are detected in the first digital image. In some implementations, this may alone be enough for topic identification engine 132 to identify topics such as "birds," "water birds," "herons," etc. as being potentially relevant to the user. However, in other implementations further corroboration may be required.

Suppose the user later watches a digital video about bald eagles. In various implementations, this fact and/or aspects of the digital video may be used, e.g., by topic identification engine 132, as another signal $250_{N-1}$ for identifying topic(s) of potential relevance to the user. For example, eagles and herons both are "birds," and therefore "birds" may be identified as a topic of potential interest to the user. Additionally or alternatively, yet another signal $250_N$ taking the form of the user performing a bird-related search ("AVIARY SUPPLIES") may be analyzed to further corroborate the user's interest in birds.

Figure 3:
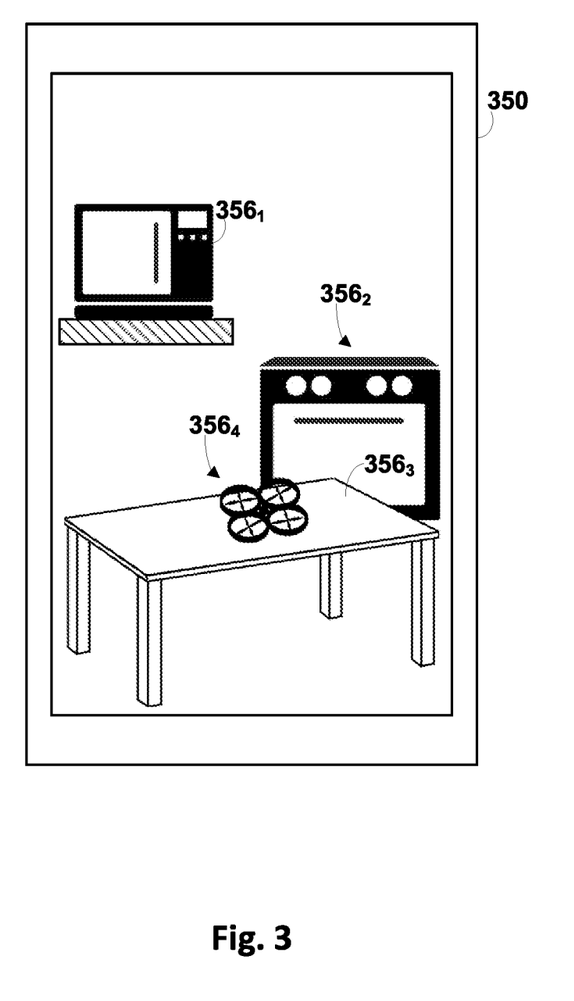

FIG. 3 depicts another example scenario in which techniques described herein may be employed to identify topics of potential relevance to a user. FIG. 3 depicts a digital photo 350 that was captured by the user, e.g., using a client device 106 in the form of a smart phone. In this example, digital photograph 350 captures a kitchen that includes a microwave $356_1$, an oven $356_2$, a table $356_3$, and on top of table $356_3$, an aerial drone $356_4$. These four objects and their respective locations within digital photograph 350 may be detected, e.g., by object recognition client 110 and/or object recognition engine 124. This data may be used, e.g., by topic identification engine 132, to identify one or more topics of potential relevance to the user.

In some implementations, topic identification engine 132 may consider whether each object detected in a digital media file falls into a particular theme or genus in determining whether the object is exceptional (and thus should be used to identify a topic of potential relevance) or merely incidental to the digital media file. For example, in FIG. 3, topic identification engine 132, e.g., with the aid of knowledge graph engine 136 and/or object frequency engine 128, may determine that three of the detected objects, $356_1$, $356_2$, and $356_3$, are relatively common in kitchens. Accordingly, the presence of these objects merely suggests that digital photograph 350 was captured in a kitchen, rather than potential interest of the user in any of these objects. However, aerial drone $356_4$ is different than (i.e. unrelated to) the other detected objects $356_{1-3}$. Moreover, aerial drone is featured relatively prominently in digital photograph 350. It is "in front of" (or in the foreground relative to) both oven $356_2$ and table $356_3$. It is also relatively close to a central region of digital photograph 350 and is in focus. Accordingly, in some implementations, topic identification engine 132 may determine that the aerial drone $356_4$ is probative of user interest in topics such as aerial drones. This potential interest may be further corroborated by other signals, such as search queries from the user relating to aerial drones, videos the user has watched that relate to aerial drones, and so forth.

Figure 4:
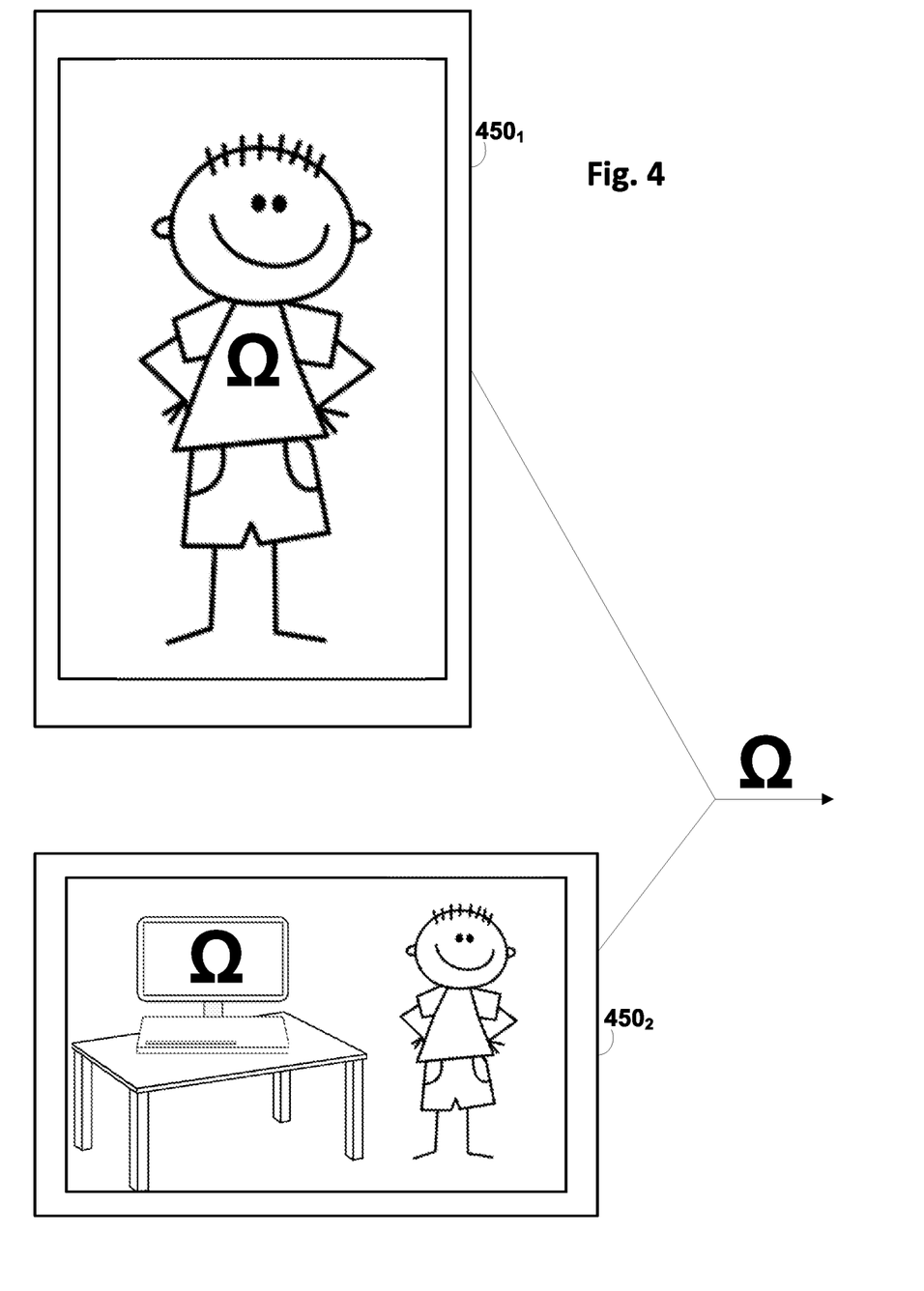

FIG. 4 depicts yet another scenario in which techniques described herein may be employed, in this example to identify one or more topics of potential relevance to a user of which the user may not be aware. In this example, the user acquires, e.g., using vision sensor 107 of client device 106, a first digital photograph $450_1$ of the user's son. It can be seen that the son is wearing a t-shirt portraying the symbol "Ω" This symbol may be, for instance, a symbol used by a musician the son enjoys. The symbol, and some cases the son's identity, may be detected, e.g., by object recognition client 110 and/or object recognition engine 124. These data may be used, e.g., by topic identification engine 132 with the aid of knowledge graph engine 136, to determine that the symbol corresponds to the particular musician.

Later, the user acquires another digital image $450_2$ that once again depicts the son. This time, the son is wearing a different t-shirt that does not depict the same symbol. However, the son's computer screen is currently displaying the same symbol, which may be detected as described above. The presence of the symbol "Ω" across multiple images of the user's son may be used, e.g., by topic identification engine 132, to determine that the topic of the musician associated with the symbol "Ω" is potentially relevant to the user. For example, when the son's birthday approaches, the father may be proactively notified of upcoming tour dates of the musician.

Once topic(s) have been identified as being potentially relevant to a user, they may be used for a variety of different purposes. In some implementations, topics of potential relevance to a user may be used to rank search results presented to the user and/or to formulate alternative query suggestions that are presented to the user. Additionally or alternatively, in some implementations, topics of potential relevance to a user may be used to disambiguate user input. Suppose a user asks a personal digital assistant executing on a particular client device 106 to call a contact named "John." There may be multiple "Johns" in the user's contact list. Rather than soliciting disambiguating input from the user, in various implementations, one or more digital media files (e.g., photographs, voicemails, videos, etc.) created and/or retrieved by the user may be analyzed as described herein to identify, as a topic of potential relevance to the user, the "John" to which the user is most likely referring. Additionally or alternatively, topics determined using techniques described herein may be used to recommend media for consumption by a user.

Figure 5:
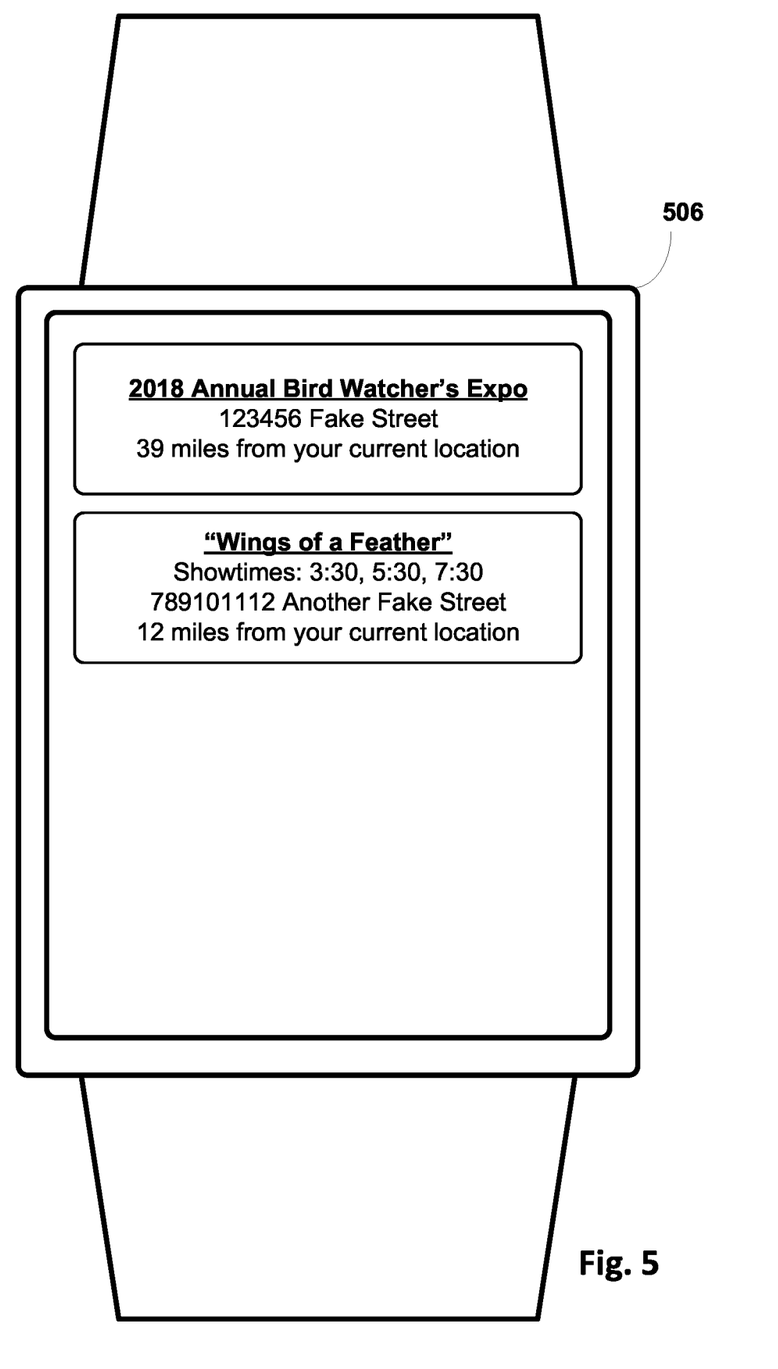
FIG. 5 schematically demonstrates an example of how content may be proactively output after performance of techniques described herein.

In some implementations, topic(s) determined using techniques described herein may be used to proactively present content to a user. For example, in FIG. 5, a client device 506 taking the form of a smart watch is being used to proactively (i.e. without being requested by a user) present content to the user. In this example, techniques described herein have been used to determine, from digital media content created and/or retrieved by the user, that the user is interested in birds. Consequently, the user is presented with a first "card" or "tile" that recommends a bird watcher's exposition nearby, and a second "card" or "tile" that recommends a nearby movie related to birds. In various implementations, these cards/tiles may be selectable deeplinks that, if selected, launch appropriate user interfaces that enable the user to obtain more information, make reservations, etc.

In various implementations, the user's engagement with content presented using techniques described herein may be used to corroborate and/or refute topics identified using techniques described herein. For example, suppose the user swipes away or otherwise disregards the cards in FIG. 5. That may suggest, in spite of techniques described herein suggesting a potential user interest in birds, that the user in fact is not interested in birds. Consequently, topic identification engine 132 may remove or demote, e.g., from user interest database 134, the topic "birds."

Figure 6:
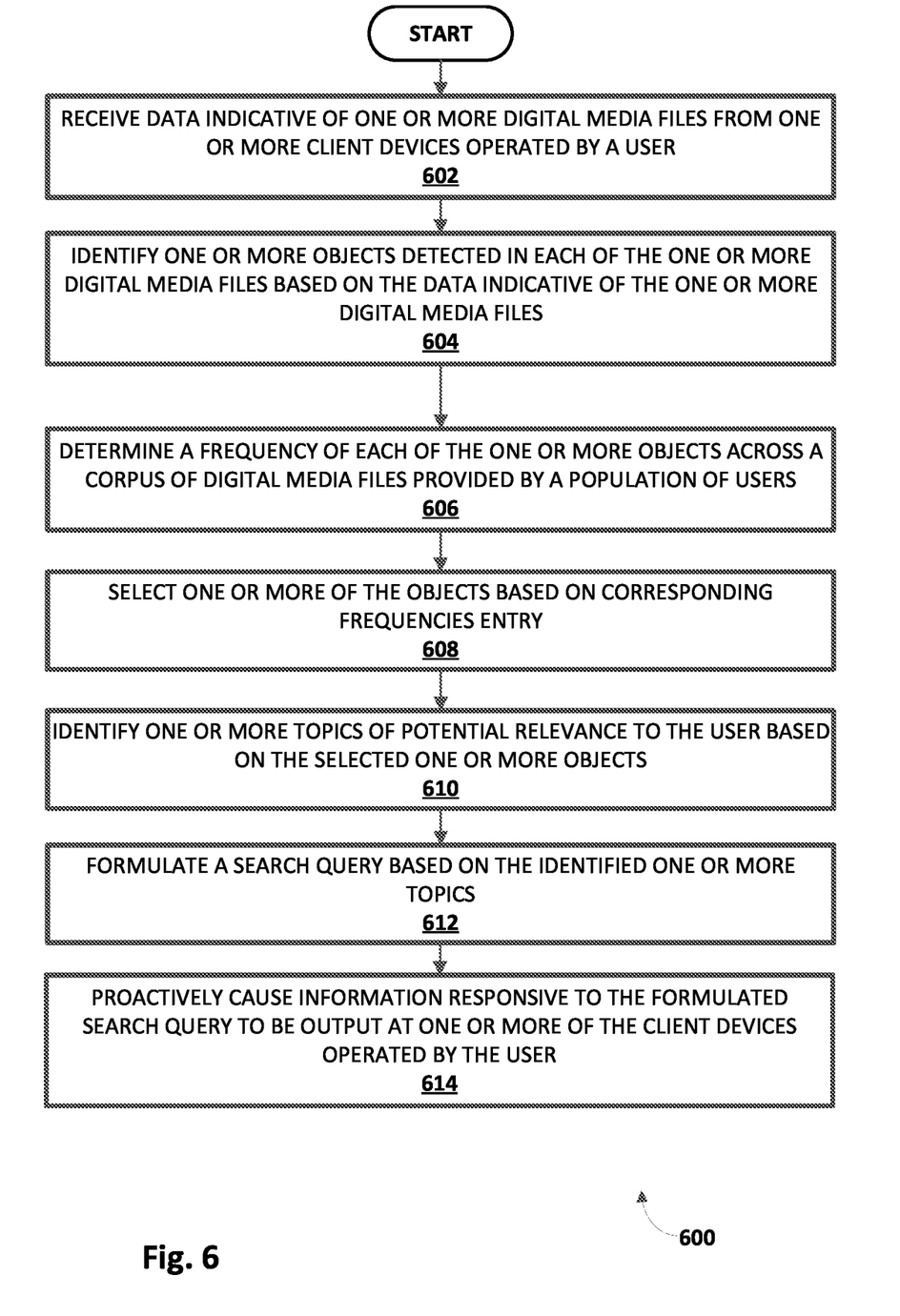
FIG. 6 depicts a flow chart illustrating an example method of performing selected aspects of the present disclosure.

Referring now to FIG. 6, an example method 600 for implementing selected aspects of the present disclosure is described. For convenience, the operations of the flow chart are described with reference to a system that performs the operations. This system may include various components of various computer systems. For instance, some operations may be performed at the client device 106, while other operations may be performed by one or more components of cloud-based system 102. Moreover, while operations of method 600 are shown in a particular order, this is not meant to be limiting. One or more operations may be reordered, omitted or added.

At block 602, the system, e.g., by way of online storage engine 120, may receive data indicative of one or more digital media files from one or more client devices (e.g., 106) operated by a user. In some implementations this data may be the raw digital media files themselves, e.g., that the user is uploading (consciously or automatically) for backup purposes. Additionally or alternatively, in some implementations this may include data generated locally at the client device that is indicative of detected objects, such as reduced dimensionality embeddings, etc. These digital media files have been created and/or retrieved for consumption by the user.

At block 604, the system, e.g., by way of object recognition client 110 and/or object recognition engine 124, may identify one or more objects detected in each of the one or more digital media files based on the data indicative of the one or more digital media files. For example, object recognition engine 124 may perform various types of object recognition (described previously) on the digital media files to detect one or more represented objects.

At block 606, the system, e.g., by way of object frequency engine 128, may determine a frequency of each of the one or more objects detected at block 604 across a corpus of digital media files (e.g., 130) provided by a population of users. As noted above, various statistics, such as TF-IDF, may be employed to determine how commonplace detected objects are, and hence, whether and/or how much they should be used to identify topics of potential relevance to users. Highly commonplace objects may effectively be noise, rather than useful signals of user interest.

At block 608, the system may select one or more of the objects that should be used to identify topics of potential interest based on corresponding frequencies determined at block 606. For example, commonplace objects like furniture, trees, etc., might not be used to identify topics of interest to a user unless, for example, those commonplace objects occur frequently among the user's digital media content and/or are featured prominently in digital media files without other, less commonplace objects (e.g., the user takes a lot of pictures of trees, without other objects present).

At block 610, the system, e.g., by way of topic identification engine 132, may identify one or more topics of potential relevance to the user based on the one or more objects selected at block 608. At block 612, the system may formulate a search query based on the identified one or more topics. For example, if the topics "birds" and "waterfowl" are identified from a user's digital photographs, then a search query such as "birds waterfowl" may be formulated and submitted to a search engine to obtain responsive content. In some implementations the responsive content may be ranked based on those topics and/or other topics identified using techniques described herein.

At block 614, the system may proactively cause information responsive to the formulated search query to be output at one or more of the client devices operated by the user. Non-limiting examples of such proactive content were depicted in FIG. 5. Additional examples of proactive content include, but are not limited to, text messages (e.g., SMS or MMS), social media messages (e.g., on a user's feed), natural language output from a personal digital assistant, e.g., during an existing human-to-computer dialog between the user and the personal digital assistant or otherwise, email messages, pop-up windows (e.g., Android Toasts), restaurant recommendations (e.g., provided in a restaurant reservation and/or review app), digital media recommendations (e.g., presented as part of a digital media app), and so forth.

Figure 7:
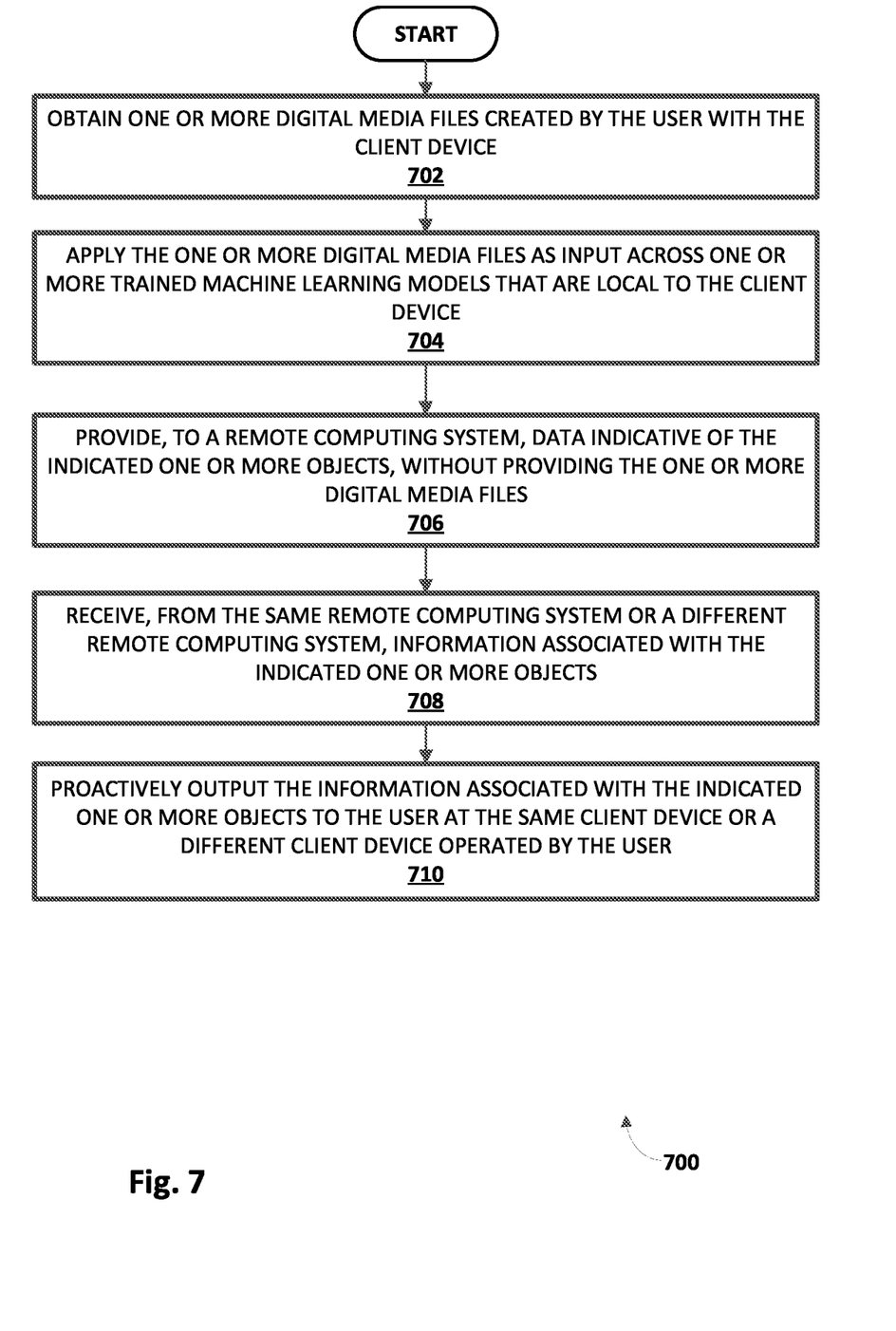
FIG. 7 depicts another flow chart illustrating an example method of performing selected aspects of the present disclosure.

Referring now to FIG. 7, another example method 700 is depicted that may be implemented in whole or in part at client device 106, in accordance with various implementations. For convenience, the operations of the flow chart are described with reference to a system that performs the operations. This system may include various components of various computer systems, particularly client device 106, although one or more operations may additionally or alternatively be performed by one or more components of cloud-based system 102. Moreover, while operations of method 700 are shown in a particular order, this is not meant to be limiting. One or more operations may be reordered, omitted or added.

At block 702, the system may obtain one or more digital media files created by the user with the client device. For example, in some implementations, the moment the user snaps a digital photo, data representing that digital photo may be stored in volatile and/or non-volatile memory. At block 704, the system, e.g., by way of object recognition client 110, may apply the one or more digital media files as input across one or more trained machine learning models that are local to the client device. For example, object recognition client 110 may apply the one or more digital media files across one or more trained machine learning models (e.g., CNNs) that are stored in on-device model index 111. In various implementations, the one or more trained machine learning models may generate output that indicates one or more objects detected in each of the one or more digital media files.

At block 706, the system (e.g., client device 106) may provide data indicative of the indicated one or more objects to a remote computing system such as cloud-based system 102, without providing the one or more digital media files themselves. The data provided at block 706 therefore may be different from the digital media files themselves, e.g., taking the form of vectors of features extracted from the digital media files, reduced dimensionality embeddings generated based on the digital media files, and so forth. For example, rather than providing raw digital photograph data to cloud-based system 102, client device 106 may provide output generated from one or more CNNs to cloud-based system 102. This output may include, for example, one or more object predictions and corresponding confidence measures (e.g., 70% probability the object is a cat, 10% probability the object is a dog, 5% probability the object is a monkey, etc.). Notably, providing these data to cloud-based system 102, rather than exposing the raw data comprising the user's digital media files to cloud-based system 102, may preserve the user's privacy to the extent the digital media files contain information the user deems private or sensitive.

At block 708, the system may receive, from the same remote computing system or a different remote computing system, information associated with the indicated one or more objects. For example, client device 106 may receive, from cloud-based system 102 or another remote computing system (such as a search engine returning search results that are responsive to a search query formulated at block 612 of FIG. 6), information associated with the one or more objects and/or topics inferred from the one or more topics. In various implementations, the objects themselves (e.g., their class or type) may form the "topics" that are considered, e.g., by topic identification engine 132, as potentially relevant to a user.

At block 710, the system may proactively output the information associated with the indicated one or more objects to the user, e.g., at the same client device 106 that was used to create the digital media file or a different client device operated by the user, such as another client device of a coordinated "ecosystem" of client devices operated by the user. For example, suppose the user captured the photograph using her smart phone. After one or more topics of potential interest to the user are identified from the photograph using techniques described herein, output related to those topics of potential interest may be presented at another client device of the user, e.g., as a card or tile on a smart watch or smart television. Some examples of proactive output were provided in FIG. 5 and described with respect to block 614 of FIG. 6.

As another example of proactive output, suppose a user had previously posted to social media a number of digital photographs of meals the user had prepared and/or consumed. Techniques described herein may be employed to identify, from the digital photos posted to social media, a potential interest of the user in cooking. Now, suppose the user later engages in a voice-based human-to-computer dialog with an automated assistant, e.g., by way of a standalone interactive speaker. Suppose further that there exists a cooking-related third party application or "agent" that the user is able to engage with via the automated assistant, but that the user is not aware of. Based on the user's perceived interest in cooking, the automated assistant may proactively introduce the user to the third party agent. For example, the automated assistant may provide audible natural language output such as, "I see that you've posted several pictures of meals to your social media account. Here is a friend of mine that is happy to recommend any number of recipes." In some cases the third party agent may then chime in with something like, "Hi there, let me know what ingredients you have or what you're in the mood for, and I'll suggest a recipe."

Figure 8:
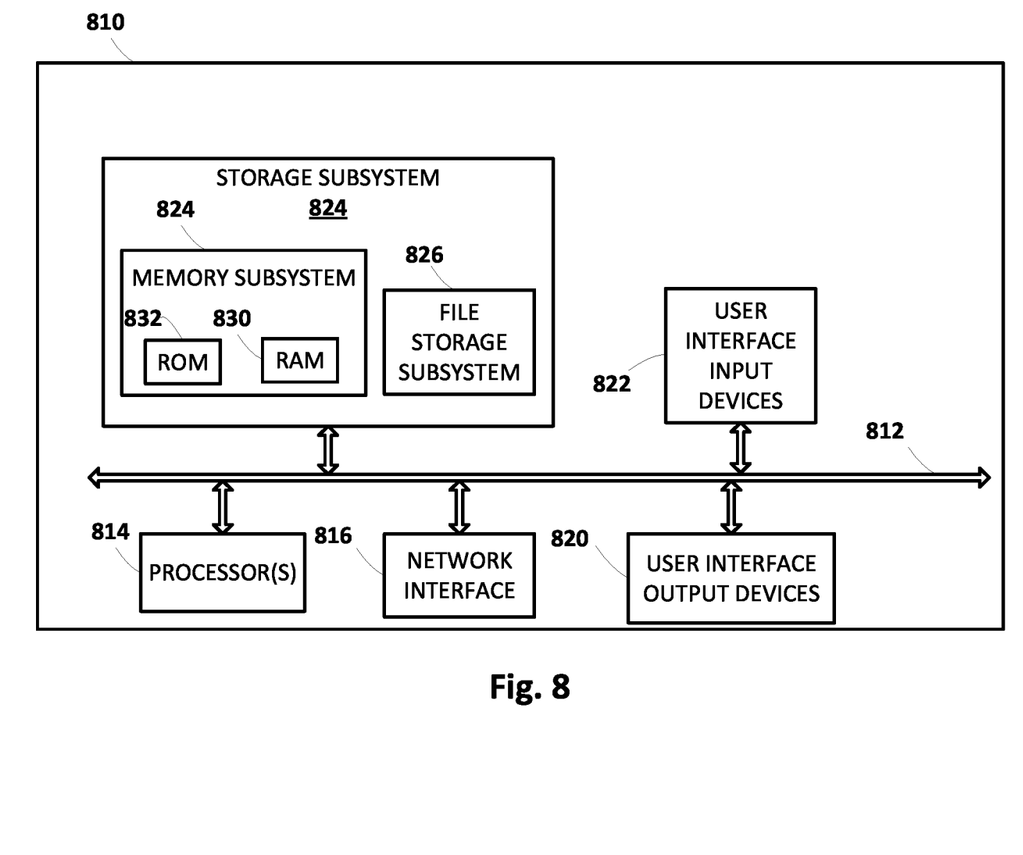
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of methods 600, 700, and/or to implement one or more of object recommendation client 110, online storage engine 120, object recognition engine 124, object frequency engine 128, topic identification engine 132, and/or knowledge graph engine 136.

These software modules are generally executed by processor 814 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 824 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 824 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining one or more digital image files created by a user with one or more client devices;
    applying the one or more digital image files as input across one or more trained object recognition machine learning models, wherein the one or more trained object recognition machine learning models generate output indicative of a plurality of objects detected in the one or more digital image files;
    analyzing the plurality of detected objects to identify a theme or genus that corresponds to a subset of multiple detected objects within the plurality;
    identifying one or more topics of potential relevance to the user based on one or more of the plurality of detected objects that are excluded from the subset;
    formulating a search query based on the identified one or more topics; and
    proactively causing information responsive to the formulated search query to be output at one or more of the client devices operated by the user.

2. The method of claim 1, wherein the theme comprises a type of location to which the detected objects of the subset are related.

3. The method of claim 2, wherein the one or more detected objects that are excluded from the subset comprise objects that are unrelated to the type of location.

4. The method of claim 2, wherein the detected objects of the subset are related to the type of location by virtue of the detected objects of the subset being commonly found in the type of location.

5. The method of claim 1, wherein one or more of the trained object recognition machine learning models comprises a convolutional neural network.

6. A client device comprising one or more processors and memory operably coupled with the one or more processors, wherein the memory stores instructions that, in response to execution of the instructions by one or more processors, cause the one or more processors to:
    obtain one or more digital image files created by a user with the client device;
    apply the one or more digital image files as input across one or more trained object recognition machine learning models, wherein the one or more trained object recognition machine learning models generate output indicative of a plurality of objects detected in the one or more digital media files;
    analyze the plurality of detected objects to identify a theme or genus that corresponds to a subset of multiple detected objects within the plurality;
    identify one or more topics of potential relevance to the user based on one or more of the detected objects that are excluded from the subset;
    formulate a search query based on the identified one or more topics; and
    proactively cause information responsive to the formulated search query to be output at one or more of the client devices operated by the user.

7. The client device of claim 6, wherein the theme comprises a type of location to which the detected objects of the subset are related.

8. The client device of claim 7, wherein the one or more detected objects that are excluded from the subset comprise objects that are unrelated to the type of location.

9. The client device of claim 7, wherein the detected objects of the subset are related to the type of location by virtue of the detected objects of the subset being commonly found in the type of location.

10. The client device of claim 6, wherein one or more of the trained object recognition machine learning models comprises a convolutional neural network.

11. At least one non-transitory computer-readable medium comprising instructions that, in response to execution of the instructions by one or more processors of a client device, cause the one or more processors to perform the following operations:
    obtaining one or more digital image files created by a user with one or more client devices;
    applying the one or more digital image files as input across one or more trained object recognition machine learning models, wherein the one or more trained object recognition machine learning models generate output indicative of a plurality of objects detected in the one or more digital image files;
    analyzing the plurality of detected objects to identify a theme or genus that corresponds to a subset of multiple detected objects within the plurality;
    identifying one or more topics of potential relevance to the user based on one or more of the plurality of detected objects that are excluded from the subset;
    formulating a search query based on the identified one or more topics; and
    proactively causing information responsive to the formulated search query to be output at one or more of the client devices operated by the user.

12. The at least one non-transitory computer-readable medium of claim 11, wherein the theme comprises a type of location to which the detected objects of the subset are related.

13. The at least one non-transitory computer-readable medium of claim 12, wherein the one or more detected objects that are excluded from the subset comprise objects that are unrelated to the type of location.

14. The at least one non-transitory computer-readable medium of claim 12, wherein the detected objects of the subset are related to the type of location by virtue of the detected objects of the subset being commonly found in the type of location.

* * * * *